Oct. 20, 1942.  W. J. UHLHORN  2,299,364
FILTER
Filed Aug. 12, 1940  2 Sheets-Sheet 1

INVENTOR.
Walter J. Uhlhorn
BY
Attorney

Oct. 20, 1942.  W. J. UHLHORN  2,299,364
FILTER
Filed Aug. 12, 1940  2 Sheets-Sheet 2

INVENTOR.
Walter J. Uhlhorn
BY
Attorney.

Patented Oct. 20, 1942

2,299,364

UNITED STATES PATENT OFFICE 2,299,364

FILTER

Walter J. Uhlhorn, Oak Park, Ill.

Application August 12, 1940, Serial No. 352,313

5 Claims. (Cl. 183—44)

This invention relates to filters especially adapted for use with drying, heating, ventilating and like systems.

In those instances where heated or otherwise treated air is supplied to or withdrawn from a drying, heating, ventilating or like system by power-operated means, it is customary to associate a so-called flow switch with the system through which air flow is thus established, such switch being operative, for example, to insure interruption of operation of the power-operated means upon failure of air flow and there are, of course, other instances where other means are provided which are responsive to air flow in a system of the aforesaid character. Since a so-called air flow switch or other means associated with a system of the aforesaid character to be responsive to air flow therein is usually a safety device, it is imperative that such a device remain in operative condition at all times, and this requires that fumes or vapors from such a system be prevented from condensing or otherwise collecting on operative parts of the safety devices, and in some instances where dust or other foreign matter is present in the system with which the device is utilized, it is essential that such dust or the like be prevented from accumulating on the operative parts of the safety device for otherwise proper operation of the device might be impaired.

Thus among the primary objects of this invention is to prevent the passage of fumes, vapors, dust or other foreign matter to the operative parts of a flow switch or other safety or like device associated with a heating, drying, ventilating or like system in which a flow of air is maintained.

A flow of air through a heating, drying, ventilating or like system is sometimes established by forcing air under pressure into the system and in other instances is established by withdrawing air from the system, a system to which air is supplied under pressure being referred to as a pressure system whereas a system from which the air is withdrawn is referred as being a suction system. Irrespective of whether a flow switch or other safety or like device is associated with a pressure system or a suction system, such device will be pressure responsive and will need be so arranged that a flow of air therethrough may be established, and among other objects of this invention is to prevent the flow of vapors, fumes, dust or other foreign matter to a flow switch or other safety or like device irrespective of whether such device is associated with a pressure or a suction system, and an ancilliary object is to enable identical means to be used for this purpose irrespective of whether the means are employed with a suction or a pressure system.

Inasmuch as an air flow will be established through the means effective to remove vapors, fumes, dust or other foreign matter from a stream of air flowing therethrough irrespective of whether such means is associated with a pressure or a suction system, the air flow will be such that it will tend to continue past any opening in the system that is not included in the direct path of air flow. Thus where an opening is provided in the side wall of a duct or the like through which a filter or like means may be inserted into the path of the system, I have observed that if the filter is removed from the system so as to expose the opening, such air flow will often continue past the opening as will be sufficient to maintain a flow switch or other like device operative. However, when this occurs, the very purpose for including a filter or the like in the system is defeated, and thus another important object of this invention is to so include a filter or like means in a system that air flow through the system to a flow switch or other safety or like device will be interrupted in event the filter is removed from the system.

More specific objects are to arrange a filter at one side of the normal path of air flow through either a pressure or a suction system in which an air flow is to be maintained; to interpose means in the normal path of air flow of a nature such that the normal path of air flow through the system will be interrupted so as to thereby direct the air through a filter or like means arranged out of the normal path of air flow in association with the means interposed in the normal path of air flow; and to provide a filter or like means which will be effective to condense or otherwise remove vapors or fumes remaining in a heating, drying, ventilating or like system after interruption of the flow of air therethrough and to enable a means of this character to be arranged intermediate the system and a flow switch or other safety or like device associated with the system so as to thereby prevent condensing of vapors, fumes or the like in the device associated with the system.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
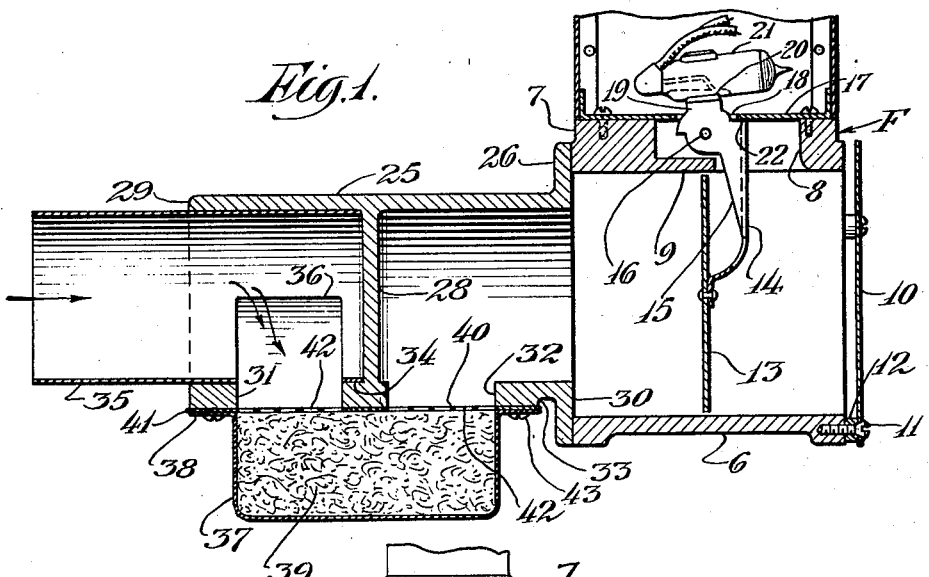
Fig. 1 is a vertical longitudinal sectional view through a flow switch of the character with which my invention may be used and also through a filter arrangement embodying my invention.
Figure 2:
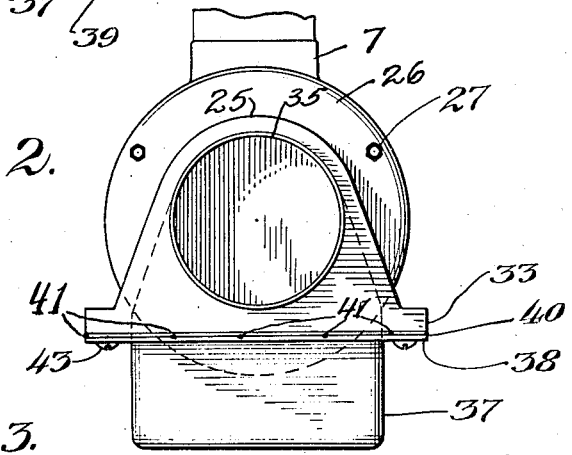
Fig. 2 is an end elevational view looking in at the left-hand end of Fig. 1.

The form of the invention shown in Figs. 1 and 2 of the accompanying drawings is shown in association with a flow switch, generally indicated by F, which is typical of the devices with which my invention may be advantageously used. This flow switch includes a substantially cylindrical housing 6 having a boss 7 provided on the periphery thereof at what is to constitute the top of the switch, and an opening 8 is formed in this boss in such a way as to define a shoulder or ledge 9. One end of the cylindrical housing 6 is covered by a plate 10 that is fastened in position by screws 11 that are passed through spacing collars 12 to thereby support the plate 10 in spaced relation with the adjacent end of the casing 6 so as to afford an outlet for air flowing into the casing 6 at the opposite end thereof. The flow switch F in the accompanying drawings is adapted for use with a pressure system and includes a circular disc 13, the medial portion of which is fast to the lower end of an arm 14, which is part of a rocker generally indicated by 15 that is pivotally mounted on a pin 16 that extends across the opening 8 and which is suitably fast in the boss 7 at opposite ends thereof.

A plate 17 is mounted on the upper side of the boss 7 to close the opening 8, this plate having an opening 18 therein through which an arm 19 of the rocker 15 is extended, the arm 19 having a saddle 20 at the free end thereof in which, in the present instance, a so-called mercury switch 21 is mounted. The upper end of the arm 14 is formed to define a shoulder 22 and when air under pressure flows into the casing 6 at the end thereof opposite that at which the plate 10 is mounted, it is effective on the disc 13 to force the shoulder 22 into engagement with an adjacent portion of the underside of the plate 17 and when the parts are in this position, the globule of mercury in the mercury switch 21 is effective to close circuit between the contacts 23 included in this switch. The disc 13, rocker 15 and saddle 20 are so arranged and the mercury switch 21 is so mounted in the saddle 20 that when less than a predetermined pressure is effective on the disc 13, the rocker 15 pivots about the pin 16 in such a way as to disengage the shoulder 22 from the plate 17 and thereupon the switch 21 is so moved that the globule of mercury therein is disengaged from the contacts included therein and circuit is then broken between the conductors leading from the switch 21.

Preferably the periphery of the disc 13 is arranged in juxtaposition to the inner wall of the casing 6 so as to render the apparatus sensitive to relatively small variations in the pressure effective on the disc. In view of this close fit, it is essential that vapors and fumes be prevented from condensing on the disc 13 and the inner wall of the casing 6 and in those instances where the switch F is to be used with systems through which dust, grit and like matter may flow, it is desirable that such foreign matter be prevented from entering the casing 6 so as to accumulate thereon and on the disc 13. If vapors, fumes, dust, grit and the like are permitted to accumulate on the inner wall of the casing 6 or on the disc 13, the disc may be prevented from moving in response to variations in the air pressure effective thereon, and this may result in failure of the switch to operate in the manner intended. It will be understood that the flow switch as F is usually employed as a safety device. For example, if the fan or other means employed for inducing an air flow through the system fails, the flow switch operates to bring a signal into operation or to interrupt the supply of power to the fan or other means effective to induce a flow of air through the system, and in those instances where heated air is supplied to the system, the flow switch may operate to interrupt operation of the burner supplying heat as by shutting off the fuel supply to the burners, and it will be understood that the flow switch or other safety or like device might be used for a wide variety of other purposes. Thus if the switch as F is prevented from operating in the manner intended, its utility as a safety device is destroyed.

Hence, in accordance with my invention, I provide a filter through which air from the system with which the switch F is used must flow prior to the time it flows into the casing of the switch and over and in contact with operative parts of the switch. By reason of the very nature of a filter so provided and the utility thereof, it will be necessary that it be replaced from time to time, and I have observed that where attempts have been made to use filtering systems in association with devices such as the flow switch F and such filters became clogged or the operation thereof was otherwise impaired or unsatisfactory, inexperienced, unskilled and sometimes even malicious persons would remove the filter and endeavor to keep the apparatus in operation without having the filter included in the system. This has usually arisen in those instances where the filter was arranged in the normal line of movement of the air through the system, and the filter was usually arranged in this position by being inserted through an opening in the side wall in the duct or other member provided for accommodating the filter. I have observed that where a filter was removed through such an opening in the side wall that the flow of air through the system usually embodies sufficient momentum that the air will flow past the opening that is disclosed by removal of the filter, and thus for a time at least the system will remain in operation. It will be appreciated, however, that under such circumstances the very purpose for which the filter is provided is defeated. In view of this, in accordance with my novel invention I associate a filter with a flow switch such as F or a like device in such a manner that if the filter is removed from the system, proper operation of the flow switch or other device with which the filter is used will not result.

Thus in the form of the invention shown in Figs. 1 and 2 I have provided a casing 25 having a flange 26 at one end thereof adapted to be secured to the inlet end of the casing of the flow switch F by bolts 27 or the like. In the present instance the casing 25, like the casing 6, is substantially cylindrical in outline and midway between the ends thereof I provide a rib 28 therein. The purpose of the rib 28 is to interrupt the direct line of air flow through the casing 25. Thus in the present instance, the end 29 of the casing 25 constitutes the inlet end thereof whereas the end 30 constitutes the outlet end thereof, and the rib 28 is so disposed between the inlet and outlet ends that a direct line of air flow between these ends is wholly interrupted.

The medial part of the casing 25 is flared outwardly and downwardly to terminate in a pad 33 to which the lower end of the rib or web 28 is joined. Openings 31 and 32 extend through the pad 33 on opposite sides of the rib 28.

A ledge is formed on the rib 28 to afford a shoulder 34 and in the present instance an inlet pipe 35 is passed through the inlet end 29 of the casing 25 to have the marginal portion of the inner end thereof rest on the shoulder 34, the inner end of the pipe 35 abutting the adjacent face of the rib 28. An opening 36 is formed in the pipe 35 to communicate with the opening 31. Thus air flowing through the pipe 35 will flow out through the openings 36 and 31 to thereby, in effect, be discharged from the casing 25, the direct flow of air from the pipe 35 to the outlet end 30 being prevented by the rib 28.

A container 37 is provided which includes an open side and which has a flange 38 projecting outwardly from the wall thereof about said open side. In the form of the invention shown in Figs. 1 and 2, the container 37 is adapted to be filled with steel wool or like material and, in order to prevent undesired or surreptitious removal of the steel wool 39 from the container 37, I provide a plate 40 which extends over the flange 38 and which, as indicated at 41, is spot welded or otherwise permanently secured to the flange 38. That part of the plate 40 closing the open side of the container 37, and which, when the container is mounted in position in the manner explained presently, is to be aligned with the openings 31 and 32, has a plurality of openings 42 provided therein, and these openings afford communication between the steel wool 39 in the container 37 and the openings 31 and 32 in the casing 25. As can best be ascertained by referring to Figs. 1 and 2, the container 37 is mounted in position on the casing 25 by abutting the exposed face of the plate 40 against the outer face of the pad 33 and then screws or bolts as 43 are passed through the flange 38 and the plate 40 and into the pad 33 to removably retain the housing or container 37 in operative position.

When the container 37 is thus mounted in position on the casing 25 and air under pressure flows through the pipe 35, it will pass out through the aligned openings 36, 31 and 42 and through the steel wool 39 in the container 37 and then out through the aligned openings 42 and 32 and thence through the outlet end 30 of the casing 25 into the casing 6 of the switch F. As the air flows through the steel wool 39, vapors, fumes, dust, grit or like foreign matter carried thereby will be condensed or collected on the steel wool and will thereby be prevented from passing to operative parts of the switch F.

When the steel wool becomes clogged, the container 37 is removed from the operative position by removing the bolts or screws 43, and when the container is thus removed from the operative position, flow of air to the switch F from the pipe 35 is interrupted for the reason that the air will be discharged through the opening 31, and since there is nothing to confine the air so discharged and guided to the opening 32, because of the removal of the container 37, air cannot flow to the switch F. When the container 37 has been thus removed, the steel wool 39 therein may either be cleaned by being immersed in a suitable solvent or a new container 37 containing a fresh supply of steel wool may be substituted for the removed container. Inasmuch as the plate 40 is welded or otherwise permanently secured to the container 37, surreptitious or otherwise unauthorized removal of the steel wool 39 from the container 37 is prevented. Thus by the arrangement that I have afforded I insure that the switch F will not be rendered operative without a filter, such as that afforded by the steel wool 39, being in operative position.

In the form of the invention shown in Figs. 1 and 2 I show the filter afforded by the steel wool 39 as being arranged on a casing 25 adapted to be directly secured to the housing or casing of a flow switch as F. In some instances, however, it will be desirable to arrange a filter of this nature in a duct at a point remote from a device such as the switch F and the manner in which this can be expeditiously accomplished is shown in Fig. 3.

Figure 3:
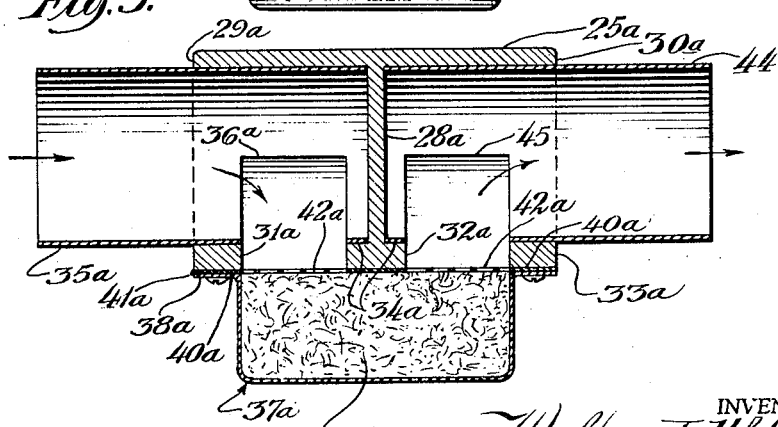
Fig. 3 is a vertical longitudinal sectional view through a filter embodying a modified form of my invention.

Thus the form of the invention shown in Fig. 3 includes a substantially cylindrical casing 25a, formed like the casing 25 and having a rib 28a disposed therein midway between the ends thereof to block off direct flow of air from the inlet end 29a of the casing 25a to the outlet end 30a of this casing. The casing 25a includes a pad 33a and has openings 31a and 32a formed therein which extend through the pad 33a. A container 37a having steel wool 39a or the like therein includes a flange 38a and an open side closed by a plate 40a welded or otherwise permanently secured to the casing 37a, as indicated at 41a, the plate 40a having openings 42a therein corresponding to the openings 42.

The rib 28a has shoulders 34a provided on both sides thereof to afford supports for the inner ends of an inlet pipe 35a and an outlet pipe 44, the inlet pipe 35a being passed into the inlet end 29a of the housing 25a and the outlet pipe 44 being passed into the outlet end 30a of the housing 25a, the inner ends of the pipes 35a and 44 preferably abutting opposite faces of the rib 28a. An opening 36a is formed in the pipe 35a to communicate with the opening 31a while an opening 45 is provided in the pipe 44 to communicate with the opening 32a.

It will be manifest from the foregoing that the form of the invention shown in Fig. 3 functions in a manner identical with the manner of operation of the invention as shown in Figs. 1 and 2 in that the direct flow of air from the inlet pipe 35a to the outlet pipe 44 is interrupted by the rib 28a, whereby air flowing in through the pipe 35a is compelled to flow through the aligned openings 36a, 31a and 32a, then through the steel wool 39a or the like in the container 37a and then out through the aligned openings 42a, 32a and 45 into the pipe 44.

Where steel wool or the like is employed, it will be effective to remove dust, grit and similar foreign matter from air passed therethrough. In many instances, however, a filter of the kind to which my invention pertains will be employed under circumstances where it is only necessary to remove vapors, fumes and like foreign matter from air flowing therethrough as by condensing such vapors, fumes or the like during flow through the filter. In an instance such as this it is desirable to afford a large surface area and at the same time to avoid materially impeding the flow of air through the filter. To this end an arrangement such as that shown in Figs. 4 and 5 may be employed.

Figure 4:
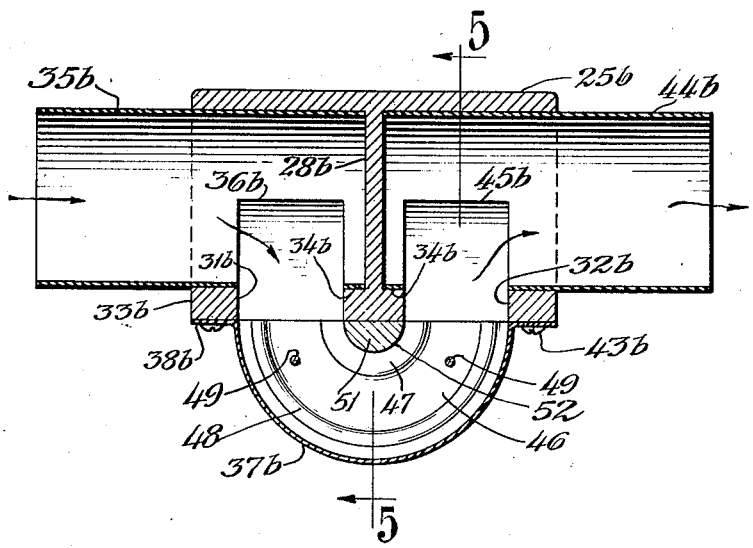
Fig. 4 is a view, similar to Fig. 3, showing a further modified form of my invention.
Figure 5:
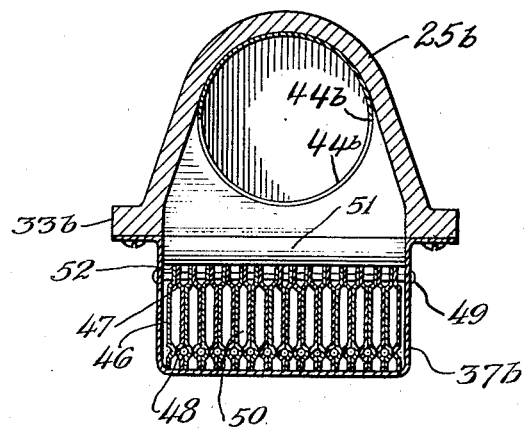
Fig. 5 is a sectional detail view taken substantially on the line 5—5 on Fig. 4.

The arrangement shown in Figs. 4 and 5 corresponds to that shown in Fig. 3 in that a substantially cylindrical casing 25b is provided which has a pad 33b on one face thereof in which openings 31b and 32b are formed, said openings being located on opposite sides of a rib 28b formed in the casing 25b. Shoulders 34b are provided that correspond to the shoulders 34a, and an inlet pipe 35b and an outlet pipe 44b have the inner marginal portions thereof engaged with these shoulders and the inner ends thereof engaged with opposite faces of the rib 28b. Openings 36b and 45b are respectively formed in the pipes 35b and 44b respectively in alinement with the openings 31b and 32b. In this instance a semi-cylindrical casing 37b is provided which includes a flange 38b that is adapted to be secured to the face of the pad 33b by screws 43b or the like. However, in place of steel wool or the like as 39 or 39a, a plurality of plates 46 are mounted in side-by-side relation in the casing 37b, these plates being substantially semi-circular in outline. The plates 46 have ribs as 47 thereon, which ribs, as best illustrated in Fig. 5, are engaged one with the other as are ribs 48 also formed on the plates, the interengagement of the ribs 47 and 48 spacing the plates 46 one from the other, whereby channels are defined between the plates. Pins 49 extend through the plates 46 and the side walls of the casing 37b and retain the plates 46 in position in said casing.

When the casing 37b is fast to the pad 33b in operative position, the channels 50 defined between the plates 46 as aforesaid lead from the opening 31b to the opening 32b, and the surfaces of the plates 46 along the channels 50 afford appreciable area for the purpose of condensing vapors, fumes or the like in air flowing through these channels so that the vapors, fumes or the like will be condensed on the plates 46 prior to the time the air flows out through the opening 45b and pipe 44b to switch as F or the like.

In order to insure accurate positioning of the container 37b on the pad 33b and therefore proper alignment of opposite ends of the channels 50 with the openings 31b and 32b, that portion of the rib 28b intermediate the openings 31b and 32b may be rounded, as indicated at 51, to fit in notches 52 formed in the plates 46.

This arrangement insures accurate orientation of the casing 37b and therefore the plates 46 and consequently the channels 50 when the casing 37b is installed in position, it being understood that the casing 37b is removably mounted in position so as to enable it to be removed for the purpose of cleaning the plates as 46 so as to free them of whatever condensate may be collected thereon or to permit the substitution of a new container 37b and plates 46 for an arrangement including the plates 46 which have been coated with condensate. The pins 49 are visible exteriorly of the casing 37b so as to give visual indication of their presence and to insure that the container as 37b will not be mounted in position without having plates as 46 housed therein.

It will be manifest from the foregoing description that I have provided an arrangement which insures that a filter will be interposed between a safety device such as a flow switch or the like and a source from which fluid may flow thereto. In this connection it is to be noted that a filter in accordance with my invention might be used in connection with a flow switch as F arranged to be responsive to suction. My invention is useful in such instances for the reason that when such a system is shut down vapors and fumes may be present therein and by reason of the relief of suction such fumes or the like may tend to rise and flow into the flow switch or other safety device, but by interposing a filtering arrangement such as disclosed therein between the switch or other safety device and the system, this is prevented.

Inasmuch as the direct flow of air from the inlet to the outlet of the device including my filter is prevented, I insure that the filtering portion of my filtering arrangement will be retained in position, for the flow of air from the inlet to the outlet can only be established in accordance with my invention through the filtering arrangement. Moreover, as I have explained hereinabove, I have provided an arrangement which will prevent unauthorized and undetectable removal of the filtering means so as to thereby further insure against improper use of the novel filter to which the present invention pertains.

While I have illustrated and described preferred embodiments of my invention, it is to be understood that these are capable of variation and modification and I therefore do not wish to be limited to the precise details set forth but desire to avail myself of such changes and alterations as fall within the purview of the following claims.

I claim:

1. In an apparatus of the class described, a casing including inlet and outlet portions, means in said casing for preventing the direct flow of fluid through said casing from the inlet to the outlet portion thereof, said casing having openings therein on opposite sides of said means, and a housing on said casing and enclosing said openings and establishing fluid communication therebetween, said housing having means therein bridging the distance between said openings and covering the same for collecting foreign matter in fluid flowing through the housing and for preventing further passage of such matter from one opening to the other, and means detachably securing the housing to the casing whereby removal of the former will destroy the fluid communication between the openings.

2. In an apparatus of the class described, a casing including inlet and outlet portions, means in said casing for preventing the direct flow of fluid through said casing from the inlet to the outlet portion thereof, said casing having openings therein on opposite sides of said means, a housing on said casing and enclosing said openings and establishing fluid communication therebetween, fluid filtering means disposed in said housing and substantially filling the latter for collecting foreign matter in fluid flowing through the housing and for preventing further passage of such matter from one opening to the other, and means detachably securing the housing to the casing whereby removal of the former will destroy the fluid communication between the openings.

3. In an apparatus of the class described, a casing having inlet and outlet portions at opposite ends thereof and having spaced openings therein intermediate said portions, a member extending across said casing intermediate the spaced openings, a housing on said casing enclosing said spaced openings, and establishing fluid communication therebetween, means in said housing for collecting foreign matter from fluid flowing through said housing, and means visible exteriorly of the casing for indicating the presence in the housing of said collecting means, said housing and said member being effective to prevent flow from the inlet to the outlet portion of said casing other than through said housing.

4. In an apparatus of the class described, a casing having inlet and outlet portions at opposite ends thereof and having spaced openings therein intermediate said portions, a member extending across said casing intermediate the spaced openings therein, a housing on said casing enclosing said spaced openings, filtering means in said housing, said housing being open on the side thereof faced toward said casing, and a plate disposed over the open side of said housing and having openings therein adapted to communicate with the spaced openings in said casing, said plate cooperating with said member to prevent flow from the inlet to the outlet portion of said casing other than through said housing and the filtering means therein.

5. An apparatus as set forth in claim 4, in which said plate is permanently secured to said housing to prevent undetectable removal of said filtering means from said housing.

WALTER J. UHLHORN.